May 7, 1935.  J. F. HUSS  2,000,136
AUTOMOBILE THEFT PREVENTING DEVICE
Filed Nov. 28, 1932   3 Sheets-Sheet 1

Inventor
JOSEPH F. HUSS
By Wilkinson & Mawhinney
Attorneys

May 7, 1935. J. F. HUSS 2,000,136
AUTOMOBILE THEFT PREVENTING DEVICE
Filed Nov. 28, 1932    3 Sheets-Sheet 2
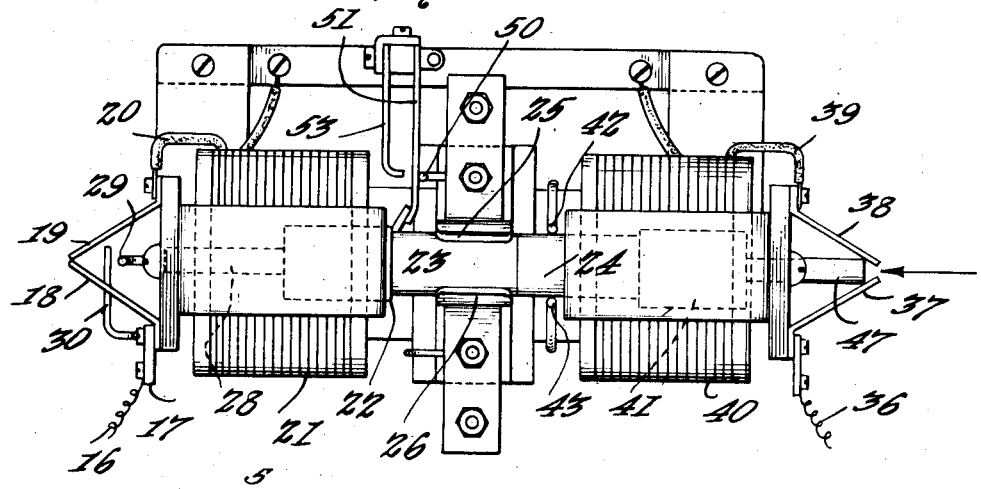
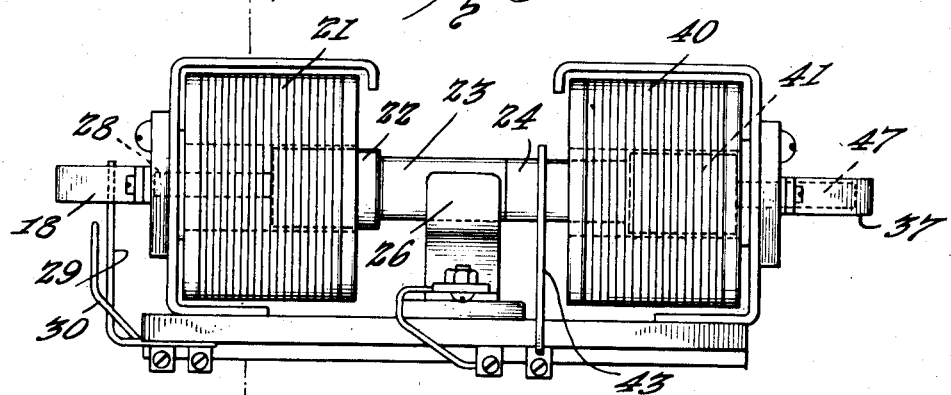
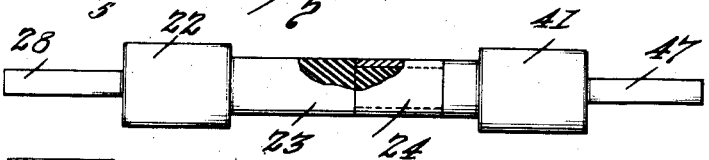
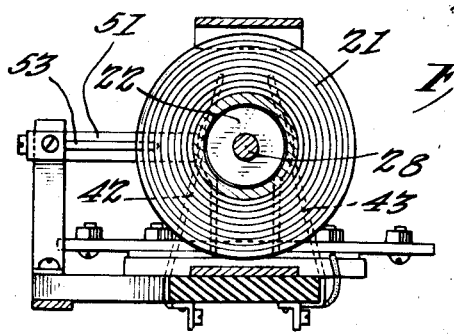
Inventor
JOSEPH F. HUSS
By
Attorneys May 7, 1935.  J. F. HUSS  2,000,136
AUTOMOBILE THEFT PREVENTING DEVICE
Filed Nov. 28, 1932  3 Sheets-Sheet 3
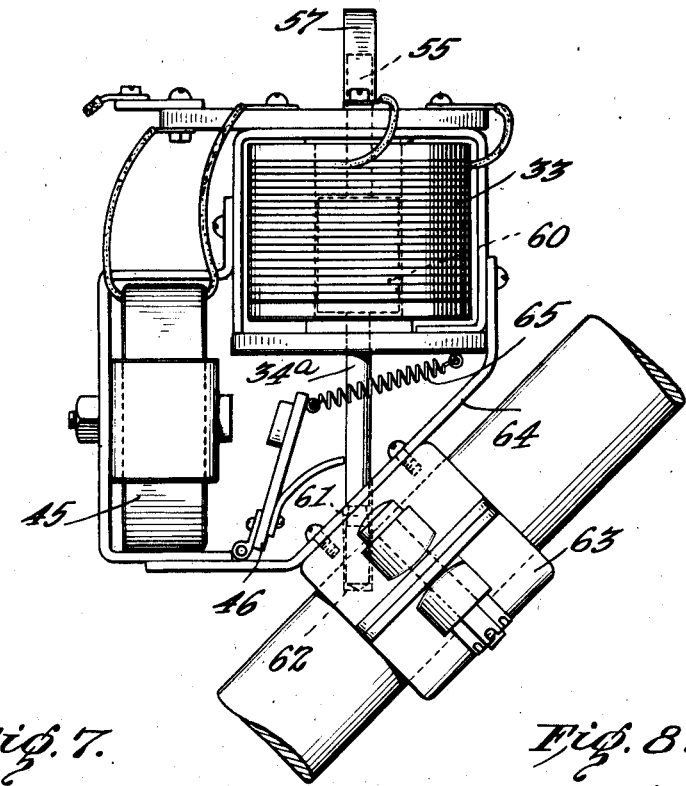
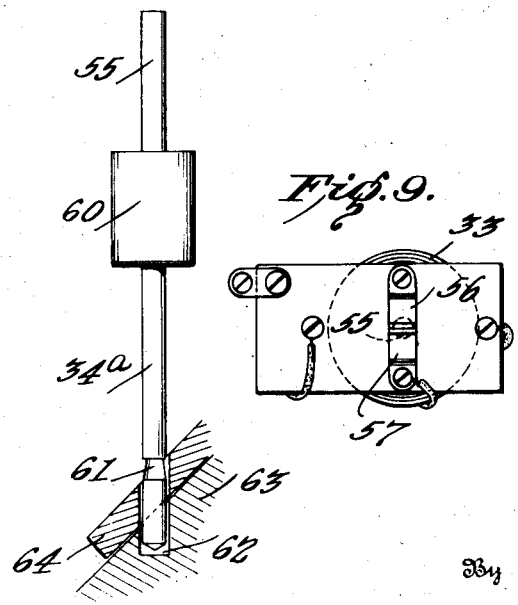
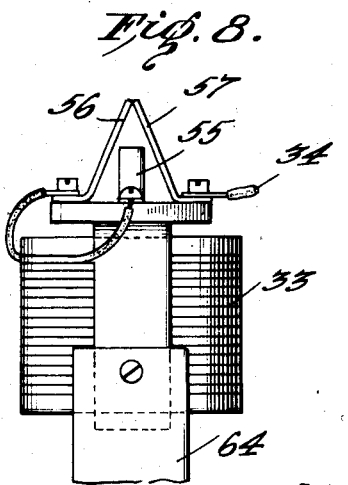
Inventor
JOSEPH F. HUSS Patented May 7, 1935

2,000,136

UNITED STATES PATENT OFFICE 2,000,136

AUTOMOBILE THEFT PREVENTING DEVICE

Joseph F. Huss, Charlotte, N. C., assignor of one-half to Burman K. Blalock, Charlotte, N. C.

Application November 28, 1932, Serial No. 644,737

2 Claims. (Cl. 177—314)

The present invention relates to improvements in automobile theft preventing devices, and has for an object to provide an improved device of this kind which will be effective to cut off the current from the starting switch and starting motor whereby the starting of the automobile may not be secured by the closing of the starter switch, and whereby current to the lights and ignition is definitely cut off and is not available through the switches ordinarily installed for this purpose.

A further object of the invention is to provide an improved system for preventing thefts of automobiles, which provides for the sounding of the horn whenever the starter switch is closed or whenever the ignition is turned on to apprise bystanders that an attempt is being made to start and operate the vehicle without authority.

A further object of the invention resides in providing means for locking the steering mechanism so that the same may not be turned by the thief.

A still further object of the invention is to provide improved switch and locking units involving simple and inexpensive constructions for carrying out the above purposes in an effective manner.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a circuit diagram according to the present invention.

Figure 2 is a top plan view of the main unit employed.

Figure 3 is a side view of the same.

Figure 4 is a plan view of the solenoid cores and connected switch band apart from the rest of the device.

Figure 5 is a cross section taken on the line 5—5 in Figure 3.

Figure 6 is a side view of the steering post locking device.

Figure 7 is a side elevation of the core of the last mentioned locking device showing parts of the steering post in section.

Figure 8 is an end view, partly broken away, of the solenoid for the locking pin, and Figure 9 is a top plan view of the same.

Figure 1:
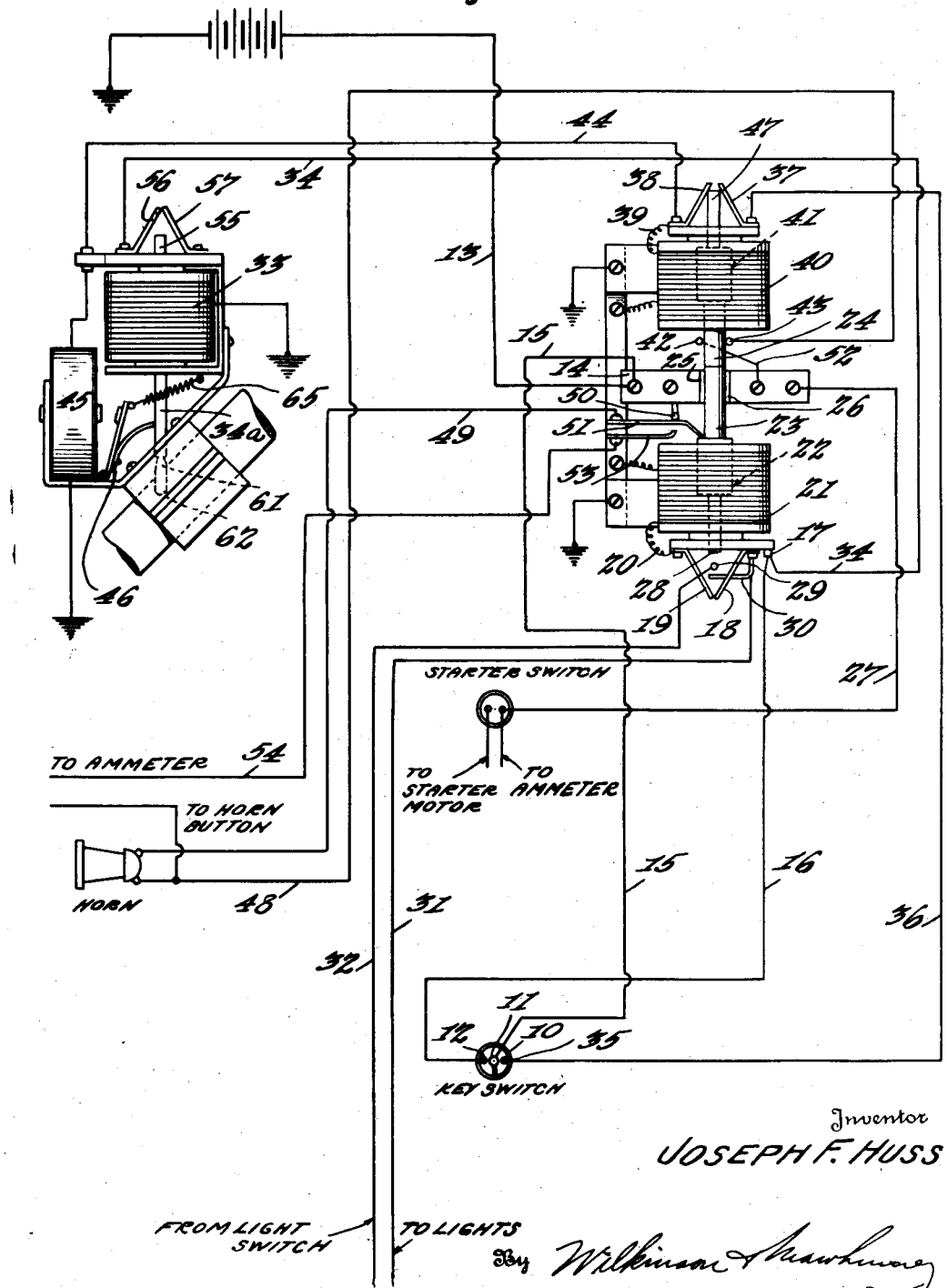

Referring more particularly to the drawings, 10 represents a switch, the key to which is held by the proprietor of the automobile. This key, when inserted and turned in one direction, closes contacts 11 and 12 of the switch. When turned in the other direction, it closes contacts 11 and 35 of the switch. The contact 11 is connected by wires 15 and 13 with the battery of the automobile, such battery being grounded on the frame of the machine as usual. The wires 13 and 15 meet in a contact member 14. A part of this contact member 14 is an upstanding spring contact finger 25 disposed in spaced relation to similar contact finger 26. Between these contact fingers is a movable insulating rod or bar 23 having a metallic contact band 24 movable into and out of the contact fingers 25 and 26, and also into and out of wire or other contact fingers 42 and 43. The rod 23 carries solenoid cores 22 and 41 disposed respectively within the solenoid windings 21 and 40. Insulating pins 28 and 47 are carried outwardly of the cores 22 and 41. The pin 28 is adapted to engage between normally closed spring contact fingers 18 and 19. The insulating pin 47 is adapted to engage between and pry apart the normally closed spring contact fingers 37 and 38. Normally closed spring contact fingers 51 and 53 are provided adjacent the electro-magnet 21, the spring contact finger 51 being disposed in the path of the core 22 whereby the core, when moved to the position shown in Figure 1, will close contacts 51 and 50 and open the contacts 51 and 53.

The light circuit is normally open through contact fingers 29 and 30 associated with the fingers 18 and 19, these contacts 29 and 30 being normally sprung apart and being in the path of the insulating pin 28 whereby to be forced closed when the pin moves out to pry the fingers 18 and 19 apart. The contacts 50, 51 and 53 are connected in the horn circuit as hereinafter described.

The steering mechanism locking device shown in Figures 6, 7, 8 and 9 includes the electro-magnetic winding 33 having therein a movable core 60, to the upper end of which is affixed the insulating pin 55 for engaging between and opening the normally closed spring contact fingers 56 and 57. The core 60 carries at its lower end the locking pin 34ᵃ having the notch 61 near its lower end. The locking pin is adapted to engage in a socket 62 of the steering post 63. The entire magnetic unit may be clamped by a collar 64 about the steering column. The notch 61 is adapted to receive a latch 46 for holding the pin 34ᵃ in elevated unlocked position during the authorized operation of the vehicle.

To avoid the pin 34ᵃ jarring loose from the latch 46, a spring 65 is coupled between the latch and a fixed part of the device. The latch is adapted to be opened or unlocked by an electro-magnet 45.

In operation, assuming the proprietor or owner of the automobile wishes to operate the same, he inserts a key with which he is vested into the key switch 10 and turns the same in a manner to cause connection between the contacts 11 and 12; thereupon a circuit may be established through the starter motor when the proprietor steps upon or otherwise closes the starter switch, such circuit being as follows: from the battery through live wire 13, contact 14, wire 15 to the contact 11 of key switch 10, thence across to contact 12 and by wire 16 to contact 17, through the spring contact fingers 18 and 19 and by lead 20 to and through the magnet winding 21 and to ground. The winding 21 being thus energized will suck in its solenoid core 22, thus shifting the insulated section 23 and causing the metal contact band 24 to be brought between the contacts 25 and 26. This allows the circuit to be established from the battery through wire 13, contact 25, contact band 24, contact 26, wire 27 to the starter switch so that energy will be supplied to the starter motor when that starter switch is closed. The starter motor is of course connected to ground. In moving to this position, the pin 28 has engaged between and separated the spring contact fingers 18 and 19, thus promptly interrupting the circuit through the winding 21 which would otherwise unduly cause discharge of the battery.

At the same time the pin 28 presses contacts 29 and 30 together enabling the closing of the light circuit 31, 32. Ordinarily, this light circuit will be open at the contacts 29, 30, as the contact 29 will spring away from the contact 30 when the pin 28 retires away from the spring contact fingers 18 and 19. Consequently an unauthorized person, even if he should close the light switch, will not get any illumination with which to operate the vehicle. This also assists to ground the horn.

At the same time the steering mechanism is unlocked by energizing the solenoid winding 33 from the wire 34 attached to the binding post or connection 17. When the winding 33 is energized, it will lift the locking pin 34ᵃ from the steering column and post and the owner of the vehicle will be free to operate the steering mechanism in the normal operation of the vehicle. The horn may be blown in the usual way by the depressing of the horn button.

Now when the owner arrives at his destination and leaves the car, he turns the key in the key switch 10 so as to open contacts 11 and 12 and close contacts 11 and 35. Immediately a circuit is established from the battery through wires 13 and 15, the key switch 10, wire 36, spring contact fingers 37 and 38, lead 39 and the electro-magnetic winding 40 to ground.

This winding 40 will suck up the core 41 and with it the other core 22 and the metal contact band 24, removing such band from between contacts 25 and 26 and bringing the band between contacts 42 and 43. Also the insulating section 23 will be brought between contacts 25 and 26 thus interrupting the circuit at this point. Thus the wire 27 and the starter switch will be cut off from the battery and no operation of the starter motor through the starter switch is possible.

At the same time current passes through the wire 44 to the electro-magnet 45 energizing same and thus attracting the latch 46 and causing the withdrawal of this latch from the notched portion of a locking pin 34ᵃ. The locking pin 34ᵃ may thus fall into the locking socket of the steering post, locking the same. It may be that the locking socket of the steering post does not register with the locking pin 34ᵃ at the time of its release from the catch or latch 46. In such case, the pin 34ᵃ will nevertheless be allowed to descend for a distance whereby the shoulder or notch of the locking pin 34ᵃ will get below the latch 46; and as soon as the steering post is turned to an appropriate position, the latch 34 will drop by gravity into the locking socket of the post. The current to the magnet 45 is of course promptly interrupted at the spring contact fingers 37 and 38 which are driven apart by the pin 47 carried by the plunger or core 41 in moving to the upper position shown.

The separation of the contact fingers 37 and 38 will also promptly interrupt the circuit to the magnet 40 and thus avoid the draining of the battery.

Therefore the owner leaves his car in such condition that the starter switch will not operate the starter motor, the lights will not burn, the circuit being open at the contacts 29, 30. Also there is no danger of short circuits in the lighting system. Moreover, the steering mechanism is locked or will be locked promptly after any operation of such steering mechanism. Furthermore the arrangement is such that the horn will be sounded whenever the starter switch is closed, thus giving audible signal to bystanders that attempt is being made to operate the automobile without authority. When the starter switch is closed, the circuit will be as follows: from the battery through wire 13, contact 14, 50 and 51, wire 49, horn, wire 48, contact 43, contact band 24, contact 42, connection 52, contact 26, wire 27, starter switch and to starter motor, which is grounded.

In the authorized operation of the horn, the contacts 50 and 51 are open and the contacts 51 and 53 are closed. The circuit thus comes from the ammeter, as controlled by the operation of the horn button. This circuit may be traced as follows: from the battery through wire 13, contact 14, metal band 24, contact 26, wire 27, starter switch, ammeter, wire 54, contacts 53 and 51, wire 49, horn and horn button which is grounded.

At times, due to the binding of the pin 34ᵃ in the socket of the steering post because the steering post may not have been turned precisely into axial alignment with the pin 34ᵃ, it will be noted that the circuit through the electro-magnet is continuous until the locking pin 34ᵃ is raised, such circuit being direct from the battery through wires 13, 15, key switch 10, wires 16 and 34. In other words, the winding 33 is energized until the release pin 55 opens the circuit through the spring contact fingers 56 and 57.

While the owner is driving and trouble develops with his lights or any of his wiring, he may shift the key switch 10 over to closed contacts 11 and 35, thus putting the system in condition to be tested and repaired without the hazard of short-circuiting and possible damage to the car by fire resulting therefrom. With the present invention, whenever a thief tries to make off with a car by running wires around the switch to the distributor, the horn will sound or at least it will sound as soon as one of the points of the distributor is closed. Also where malicious persons turn on the ignition or light switches of automobiles, the present device still registers an open circuit at another point and thereby saves the battery and injury to the coil.

It will be obvious that various changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:—

1. In a theft preventing device for automobiles having a battery, a starter switch and a steering shaft, a pair of normally open contacts, one of which is connected to the battery and the other to the starter switch, oppositely disposed solenoids, circuit closing means moved by one of said solenoids into engagement with said contacts for closing the circuit to the starter switch, circuit breaking means movable with said circuit closing means and operable under actuaton of the other solenoid to break the circuit to the starter switch, separate circuits for said solenoids, means operable by said one solenoid for opening the circuit to said one solenoid consequent upon closing thereof, manually operable switch means connected to said separate circuits for controlling the closing thereof, locking means for the steering shaft, electrically operated means in circuit with said one solenoid for moving said locking means to released position, and electrically operated means in circuit with said other solenoid for holding said locking means in released position.

2. In a theft preventing device for automobiles having a battery, starter switch and a steering shaft, a pair of normally open contacts, one of which is connected to the battery and the other to the starter switch, electro-magnets disposed at opposite sides of said contacts, circuit closing means moved by said electro-magnets into and out of said contacts, separate circuits for said electro-magnets including each pair of normally closed spring contact fingers closing said separate circuits, insulating members moved by said electro-magnets for engaging between said fingers and moving the same apart to open said separate circuits, circuit breaking means carried by said circuit closing means for breaking the circuits to the starter switch, a key switch for selectively closing each electro-magnet circuit when its insulating member is not disposed between its contact fingers, locking means for the steering shaft, electrically operated means in circuit with one of said electro magnets for moving said locking means to released position, and electrically operated means in circuit with another of said electro-magnets for holding said locking means in released position.

JOSEPH F. HUSS.